Figure 1:
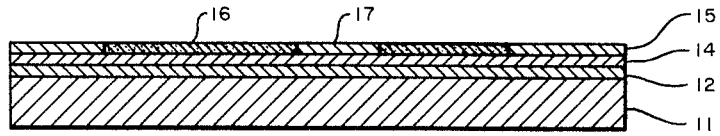

Jan. 4, 1966     D. Z. BLAU ETAL     3,227,879

INFRARED SIMULATOR

Filed Oct. 21, 1963     2 Sheets-Sheet 1

INVENTORS
DONALD Z. BLAU
LEONARD SCHWARTZ

BY

ATTORNEY.

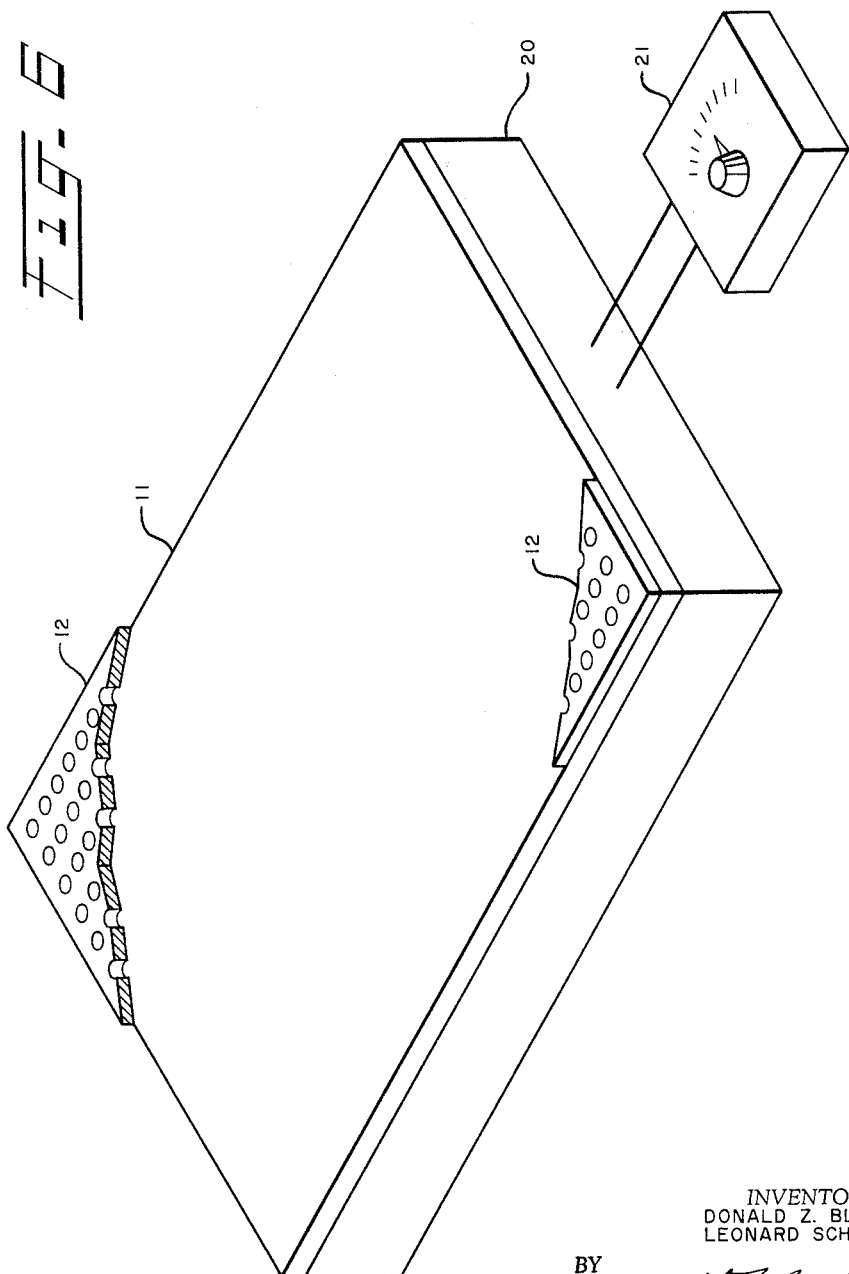

3,227,879
INFRARED SIMULATOR
Donald Z. Blau, Mount Vernon, and Leonard Schwartz, Yonkers, N.Y., assignors to General Precision, Inc., a corporation of Delaware
Filed Oct. 21, 1963, Ser. No. 317,562
8 Claims. (Cl. 250—84)

This invention relates to simulators generally and more particularly to simulators suitable for recreating or generating an infrared scene.

Infrared simulators are particularly useful in correlation devices where an actual scene is compared with a generated scene for correlation purposes. Such devices are used in aircraft control and guidance systems where an actual infrared scene is correlated with an infrared simulator in order to determine the exact location of the aircraft or of a particular target on the ground. In this type of application a source is prepared which is a replica of an area over which the aircraft is to fly. Detectors on the aircraft scan the area during flight and the output of the detectors are correlated with the prepared source output. Upon correlation the exact location of the aircraft or of the target is known.

The above described correlation system is old in the art, however the fabrication of the infrared simulator has presented a number of problems and until applicants' discovery no completely satisfactory device for fabricating such infrared simulators was known.

One object of the present invention is to provide an infrared simulator which will simulate areas of varying radiation intensity with a fine detail.

Another object of the invention is to provide an infrared simulator which contains areas of varying radiation.

A further object of the invention is to provide a novel method of fabricating an infrared simulator.

The invention contemplates a novel device for simulating an infrared scene and novel method for accomplishing this same result.

The foregoing and other objects and advantages of the invention will become more apparent from a consideration of the drawings and specification wherein one embodiment of the invention is shown and described for illustrative purposes only.

In the drawings:

FIGURES 1-5, inclusive, are cross sectional views illustrating the successive steps in the development of the novel infrared source plate constructed in accordance with the invention, and FIGURE 6 is an isometric view of a complete infrared simulator.

In FIGURE 1 a base member 11, which may be constructed of laminated sheet members such as paper or continuous filament woven glass fibers impregnated with either a phenolic or an epoxy resin binder, supports a metalic deposit 12. The metalic deposit 12 must exhibit low infrared emissivity and should be about one-eightieth that of base 11. Nickel, chromium, platinum, tungsten, cobalt, cadmium, gold and copper all satisfy the above requirement. However, copper oxidizes and changes its infrared emissivity as it oxidizes. Therefore it must be polished before use. Silver is subject to tarnishing and is therefore subject to the same limitation.

In addition to the above requirement a good bond between the base member 11 and the deposit 12 must be secured. This may not be possible with certain high emissivity base materials for all of the low emissivity metals. In such cases copper may be deposited on the base and the desired metal plated to the copper, thus, making possible a secure bond while securing the desired surface condition which controls the emissivity. The above technique should not be employed where a satisfactory bond may be secured since for reasons which will appear later the thickness of the metalic coating must be kept to a minimum.

Figure 2:
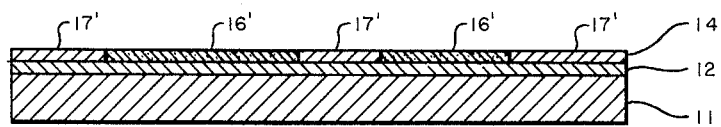
Figure 3:
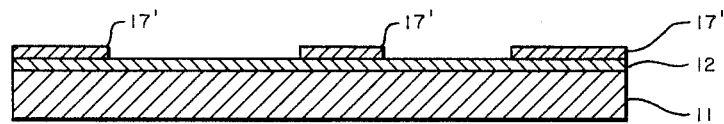

A coating of photo resistive material 14 such as that marketed by the Eastman Kodak Co., Rochester, New York under the designation KMER is used to cover the metallic surface 12 and a negative image 15 of the infrared scene to be simulated is supported over the photo resistive material 14. For the sake of simplicity the negative image is shown in contact, however it may be so placed as to secure enlargement or reduction as is well known in the photographic art. The negative 15 contains dark and light areas 16 and 17 respectively. The dark areas 16 will not transmit light while the light areas 17 transmit light. The effect of this is illustrated in FIGURE 2 where the areas 16' of the photo resistive material 14 are unexposed while the areas 17' are exposed. Upon development and washing which may be carried out in a conventional manner, only the areas 17', FIGURE 3, which have been exposed remain attached to metallic deposit 12.

Figure 4:
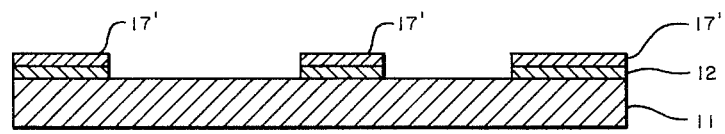

The source plate when in this condition is ready for etching. If the exposure has been through a half tone negative of the infrared scene the etching process will undercut a thick layer of metal, thus, the thickness of the metallic deposit 12 must be comparable to the screen size used in producing the half tone negative image for a contact print. The completed etched source plate is illustrated in FIGURE 4 and FIGURE 5 shows the completed source plate after removal of the exposed photo resistive material 17'.

Figure 5:

In FIGURE 6 a completed source plate similar to that shown in FIGURE 5 and comprising a base 11 with an etched metallic coating 12 is placed in contact with an electric hot plate 20 which is connected to an adjustable power source 21. Plate 20 must be capable of elevating both the base 11 and the etched metallic coating 12 to the same uniform temperature at which temperature the ratio of the infrared emissivities of the exposed portions of base 11 and the metallic covered areas is eighty to one or better depending on the temperature and the specific materials selected for the base and the metallic coating. With the materials set forth above a ratio between about 80 to 1 and 90 to 1 or better may be readily obtained.

While only one embodiment of the invention has been illustrated and described in detail, it is to be expressly understood that the invention is not to be limited thereto. Various changes may also be made in the choice of materials and arrangement of the parts without departing from the spirit and scope of the invention as the same will now be understood by those skilled in the art.

What is claimed is:

1. A device for simulating an infrared scene comprising,
    an imperforate base member,
    a perforate member having a physical configuration corresponding to the infrared scene to be simulated located in intimate contact with one surface of said base member,
    said imperforate base member and said perforate member having different infrared emissivities in a ratio of at least 80 to 1, and
    means for elevating the temperature of both members to a preselected temperature whereby the ratio of the intensity of the infrared radiation from the covered and uncovered areas of the imperforate base is at least 80 to 1.

2. A device for simulating an infrared scene comprising,
    a base member constructed of a non-metallic sheet material impregnated with a phenolic resin and having a high infrared emissivity,
    a metallic deposition on one surface only of said base member said deposition covering predetermined portions of said base and corresponding in configuration to the infrared scene to be simulated, said metallic deposition being selected from a group of metals exhibiting a low infrared emissivity and being at least one-eightieth that of the base, and means for heating the base member and the metallic deposition to a preselected temperature whereby the uncovered base areas emit infrared radiation at a level at least 80 times that of the areas covered by the metallic deposition.

3. A device for simulating an infrared scene comprising, a non-metallic base member having a high degree of infrared emissivity, a metallic deposit on one surface of said base member, said deposit having a density per unit area inversely proportional to the intensity of infrared radiation emanating from the corresponding area in the scene which is to be simulated and having an infrared emissivity no greater than at least one-eightieth that of the base member, and means for elevating the temperature of the base and deposit to a preselected temperature whereby the uncovered base areas emit infrared radiation at a level at least 80 times that of areas covered by the metallic deposit.

4. A device for simulating an infrared scene comprising, a non-metallic base member having a high degree of infrared emissivity, a metallic deposit of substantially uniform size and shape on one surface of said base member, said deposit having a density per unit area which is an inverse function of the intensity of infrared radiation emanating from the corresponding area in the scene which is to be simulated and each having an infrared emissivity no greater than at least one-eightieth that of the base member, and means for elevating the temperature of the base and deposit to a preselected temperature whereby the uncovered base areas emit infrared radiation at a level at least 80 times that of the areas covered by the metallic deposit.

5. An infrared simulator as set forth in claim 4 in which said base member is constructed of a phenolic resin impregnated sheet member.

6. An infrared simulator as set forth in claim 4 in which said base member is constructed of an epoxy resin impregnated sheet member.

7. An infrared simulator as set forth in claim 4 in which said base member is constructed of a sheet woven of continuous filament glass fibers impregnated with an epoxy resin.

8. An infrared simulator as set forth in claim 4 in which said base member is constructed of a sheet woven of continuous filament glass fibers impregnated with a phenolic resin.

References Cited by the Examiner
UNITED STATES PATENTS

| | | | |
|---|---|---|---|
| 2,526,682 | 10/1950 | Mulberger et al. | 343—9 |
| 2,666,008 | 1/1954 | Enslein et al. | 156—11 X |
| 3,041,011 | 6/1962 | Dhanes | 244—14 |
| 3,052,042 | 9/1962 | Feder | 96—36 |

RALPH G. NILSON, *Primary Examiner.*

REUBEN EPSTEIN, *Examiner.*